(12) United States Patent
Back et al.

(10) Patent No.: US 7,773,510 B2
(45) Date of Patent: Aug. 10, 2010

(54) APPLICATION ROUTING IN A DISTRIBUTED COMPUTE ENVIRONMENT

(75) Inventors: Jonathan Back, Vancouver (CA); Siegfried J. Luft, Vancouver (CA)

(73) Assignee: Zeugma Systems Inc., Richmond (CA)

( * ) Notice: Subject to any disclaimer, the term of this patent is extended or adjusted under 35 U.S.C. 154(b) by 501 days.

(21) Appl. No.: 11/807,305

(22) Filed: May 25, 2007

(65) Prior Publication Data

US 2008/0291923 A1 Nov. 27, 2008

(51) Int. Cl.
*H04L 12/56* (2006.01)
*H04J 1/16* (2006.01)
(52) U.S. Cl. .................. 370/230; 370/351; 370/386
(58) Field of Classification Search .................. 370/252, 370/386, 389, 419, 230, 351
See application file for complete search history.

(56) References Cited

U.S. PATENT DOCUMENTS

| | | | |
|---|---|---|---|
| 4,720,850 | A | 1/1988 | Oberlander et al. |
| 4,893,302 | A | 1/1990 | Hemmady et al. |
| 5,428,781 | A | 6/1995 | Duault et al. |
| 5,673,382 | A | 9/1997 | Cannon et al. |
| 6,111,852 | A | 8/2000 | Leung et al. |
| 6,148,410 | A | 11/2000 | Baskey et al. |
| 6,262,974 | B1 | 7/2001 | Chevalier et al. |
| 6,320,863 | B1 | 11/2001 | Ramfelt |
| 6,412,000 | B1 | 6/2002 | Riddle et al. |
| 6,587,470 | B1 | 7/2003 | Elliot et al. |
| 6,608,832 | B2 | 8/2003 | Forslow |
| 6,615,262 | B2 | 9/2003 | Schweitzer et al. |
| 6,618,355 | B1 | 9/2003 | Gulliford et al. |
| 6,678,281 | B1 | 1/2004 | Chakrabarti et al. |
| 6,694,450 | B1 | 2/2004 | Kidder et al. |
| 6,741,595 | B2 | 5/2004 | Maher et al. |
| 6,751,191 | B1 | 6/2004 | Kanekar et al. |
| 6,779,030 | B1 | 8/2004 | Dugan et al. |
| 6,789,116 | B1 | 9/2004 | Sarkissian et al. |
| 6,807,156 | B1 | 10/2004 | Veres et al. |
| 6,847,613 | B2 | 1/2005 | Mimura et al. |

(Continued)

FOREIGN PATENT DOCUMENTS

CA    1 295 391    2/1992

(Continued)

OTHER PUBLICATIONS

Cisco Systems, "NetFlow Services Solutions Guide", Last updated Jan. 22, 2007, pp. 1-72, http://www.cisco.com/en/US/docs/ios/solutions_docs/netflow/nfwhite.pdf.

(Continued)

*Primary Examiner*—John Pezzlo
(74) *Attorney, Agent, or Firm*—Blakely Sokoloff Taylor & Zafman LLP

(57) ABSTRACT

A multi-level classification scheme for classifying subscriber traffic at a network node coupled between subscribers of network services and providers of the network services includes two levels of classification. The subscriber traffic is received at the network service node. A first portion of the subscriber traffic is selectively routed from a plurality of first level routers to a plurality of second level routers within the network service node. The first portion of the subscriber traffic is then selectively routed from the second level routers to network applications executing within the network service node for processing.

34 Claims, 9 Drawing Sheets

U.S. PATENT DOCUMENTS

| | | | |
|---|---|---|---|
| 6,873,600 | B1 | 3/2005 | Duffield et al. |
| 6,920,109 | B2 | 7/2005 | Yazaki et al. |
| 6,944,673 | B2 | 9/2005 | Malan et al. |
| 6,948,003 | B1 | 9/2005 | Newman et al. |
| 6,961,539 | B2 | 11/2005 | Schweinhart et al. |
| 6,968,394 | B1 * | 11/2005 | El-Rafie ............... 709/245 |
| 6,985,431 | B1 | 1/2006 | Bass et al. |
| 7,002,977 | B1 | 2/2006 | Jogalekar |
| 7,085,230 | B2 | 8/2006 | Hardy |
| 7,120,931 | B1 | 10/2006 | Cheriton |
| 7,143,006 | B2 | 11/2006 | Ma et al. |
| 7,203,169 | B1 | 4/2007 | Okholm et al. |
| 7,251,215 | B1 | 7/2007 | Turner et al. |
| 7,257,616 | B2 | 8/2007 | Bass et al. |
| 7,272,115 | B2 | 9/2007 | Maher, III et al. |
| 7,289,433 | B1 | 10/2007 | Chmara et al. |
| 7,299,277 | B1 * | 11/2007 | Moran et al. ............ 709/224 |
| 7,376,731 | B2 | 5/2008 | Khan et al. |
| 7,420,917 | B2 | 9/2008 | Ishikawa et al. |
| 7,453,804 | B1 | 11/2008 | Feroz et al. |
| 7,492,713 | B1 | 2/2009 | Turner et al. |
| 7,496,661 | B1 | 2/2009 | Morford et al. |
| 7,620,526 | B2 | 11/2009 | Back et al. |
| 2002/0016860 | A1 | 2/2002 | Garcia-Luna-Aceves et al. |
| 2002/0036983 | A1 | 3/2002 | Widegren et al. |
| 2002/0107908 | A1 | 8/2002 | Dharanikota |
| 2002/0116521 | A1 | 8/2002 | Paul et al. |
| 2002/0122422 | A1 | 9/2002 | Kenney et al. |
| 2002/0122424 | A1 | 9/2002 | Kawarai et al. |
| 2002/0126623 | A1 | 9/2002 | Kiendl |
| 2002/0181462 | A1 | 12/2002 | Surdila et al. |
| 2003/0005112 | A1 | 1/2003 | Krautkremer |
| 2003/0067903 | A1 | 4/2003 | Jorgensen |
| 2003/0081546 | A1 | 5/2003 | Agrawal et al. |
| 2003/0108015 | A1 | 6/2003 | Li |
| 2003/0118029 | A1 | 6/2003 | Maher et al. |
| 2003/0229710 | A1 | 12/2003 | Lie et al. |
| 2003/0235209 | A1 | 12/2003 | Garg et al. |
| 2004/0013089 | A1 | 1/2004 | Taneja et al. |
| 2004/0028051 | A1 | 2/2004 | Etemadi et al. |
| 2004/0071084 | A1 | 4/2004 | El-Hennawey et al. |
| 2004/0111461 | A1 | 6/2004 | Claudatos et al. |
| 2004/0248583 | A1 | 12/2004 | Satt et al. |
| 2005/0036512 | A1 | 2/2005 | Loukianov |
| 2005/0041583 | A1 | 2/2005 | Su et al. |
| 2005/0041584 | A1 | 2/2005 | Lau et al. |
| 2005/0068722 | A1 | 3/2005 | Wei |
| 2005/0089043 | A1 | 4/2005 | Seckin et al. |
| 2005/0100000 | A1 | 5/2005 | Faulkner et al. |
| 2005/0141493 | A1 | 6/2005 | Hardy et al. |
| 2005/0213504 | A1 | 9/2005 | Enomoto et al. |
| 2005/0254502 | A1 | 11/2005 | Choi |
| 2006/0015698 | A1 | 1/2006 | Kim et al. |
| 2006/0028982 | A1 | 2/2006 | Wright |
| 2006/0028983 | A1 * | 2/2006 | Wright ............... 370/230 |
| 2006/0072451 | A1 | 4/2006 | Ross |
| 2006/0077963 | A1 | 4/2006 | Li et al. |
| 2006/0101159 | A1 | 5/2006 | Yeh et al. |
| 2006/0114832 | A1 | 6/2006 | Hamilton et al. |
| 2006/0140119 | A1 | 6/2006 | Yeh et al. |
| 2006/0140128 | A1 | 6/2006 | Chi et al. |
| 2006/0149841 | A1 | 7/2006 | Strub |
| 2006/0153174 | A1 | 7/2006 | Towns-von Stauber et al. |
| 2006/0233100 | A1 | 10/2006 | Luft et al. |
| 2006/0233101 | A1 | 10/2006 | Luft et al. |
| 2007/0058629 | A1 | 3/2007 | Luft |
| 2007/0058632 | A1 | 3/2007 | Back et al. |
| 2007/0061433 | A1 | 3/2007 | Reynolds et al. |
| 2007/0127473 | A1 | 6/2007 | Kessler et al. |
| 2007/0140131 | A1 | 6/2007 | Malloy et al. |
| 2007/0195872 | A1 | 8/2007 | Diaz |
| 2007/0233698 | A1 | 10/2007 | Sundar et al. |
| 2007/0234364 | A1 | 10/2007 | Lipton et al. |
| 2007/0286351 | A1 | 12/2007 | Ethier et al. |
| 2008/0082979 | A1 | 4/2008 | Coppinger et al. |
| 2008/0104085 | A1 | 5/2008 | Papoutsakis et al. |
| 2008/0134327 | A1 | 6/2008 | Bharrat et al. |
| 2008/0155087 | A1 | 6/2008 | Blouin et al. |
| 2008/0177424 | A1 | 7/2008 | Wheeler |

FOREIGN PATENT DOCUMENTS

| | | |
|---|---|---|
| CA | 2 276 526 A1 | 7/1998 |
| CA | 2 511 997 A1 | 8/2004 |
| EP | 1093266 A2 | 4/2001 |
| WO | WO 99/30460 | 6/1999 |
| WO | WO 00/33511 A1 | 6/2000 |
| WO | WO 02/15521 A1 | 2/2002 |
| WO | WO 02/21276 A1 | 3/2002 |
| WO | WO 03/094449 A1 | 11/2003 |
| WO | WO 03/103239 A1 | 12/2003 |
| WO | WO2005/017707 A2 | 2/2005 |
| WO | WO 2005/022852 A1 | 2/2005 |
| WO | WO/2005/088929 | 9/2005 |
| WO | WO 2006/020834 A1 | 2/2006 |
| WO | WO 2007/030916 A1 | 3/2007 |
| WO | WO 2007/030917 A1 | 3/2007 |

OTHER PUBLICATIONS

Cisco Systems, "NetFlow Ecosystems Solutions, white paper", Feb. 5, 2007, pp. 1-29, http://www.cisco.com/warp/public/732/Tech/nmp/netflow/docs/netflow_eco_WP.pdf.

Chakchai, So-In, "A Survey of Network Traffic Monitoring and Analysis Tools", Washington University in St. Louis, Fall 2006, pp. 1-27, http://www.rajjain.com/cse567-06/ftp/net_traffic_monitors3/index.html.

Bodin, U., Schelen, O., and Vemmervik, C., "End-to-End QoS control architectures from a wholesale and retail perspective: benefits and challenges." [retrieved Apr. 19, 2007]. Retrieved from the Internet: www.operax.com. Operax, Tegeluddsvägen 92, SE-115 28, Stockholm, Sweden.

Gallon, C., and Schelen, O., MSF Technical Report, MSF-TR-ARCH-005-Final. "Bandwidth Management in Next Generation Packet Networks." MultiService Forum. Aug. 2005. [retrieved Apr. 19, 2007]. Retrieved from the Internet: <URL: http://www.msforum.org/techinfo/reports/MSF-TR-ARCH-005-FINAL.pdf>.

Jungck, Peder. Open Network Services Platforms for High-Value Network Services [online], 2004 [retrieved Feb. 28, 2007]. Retrived from the Internet: CloudShield Technologies, Inc., www.cloudshield.com. CloudShield, 212 Gibraltar Drive, Sunnyvale, California 94089.

"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.

"Arbor Peakflow SP on CS-2000: CloudShield and Arbor Networks Integrated Solution for DDoS Control." [retrieved Feb. 28, 2007] . Retrieved from the Internet: CloudShield Technologies, Inc., www.cloudshiled.com. CloudShield, 212 Gibraltar Drive, Sunnyvale, California 94089. 2005.

"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.

"Broadband Architectures to Go Above and Beyond Triple Play." [retrieved Feb. 28, 2007]. Retrieved from the Internet: www.operax.com. Operax, Tegeluddsvägen 92, SE-115 28, Stockholm, Sweden. Sep. 2005.

"CloudShield Content Control Suite: Modular Software for Implementing Multi-Function Service Control." [retrieved Feb. 28, 2007]. Retrieved from the Internet: CloudShield Technologies, Inc., www.cloudshield.com. CloudShield, 212 Gibraltar Drive, Sunnyvale, California 94089. 2006.

"CloudShield Network Observatory: CS-2000 with $3^{rd}$ Party Applications Bring Network Content Into Focus." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"CloudShield PacketWorks IDE: Developers' Toolkit for CS-2000 In-Network Computing Platform." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"CS-2000 Content Processing Platform: Multi-Function Systems for Controlling and Securing Next Generataion Services." [retrieved Feb. 28, 2007]. Retrieved from the Internet: CloudShield Technologies, Inc., www.cloudshield.com. CloudShield, 212 Gibraltar Drive, Sunnyvale, California 94089. 2006.

"Delivering Video over IP," Microsoft Corporation, 2003.

"Efficient Network Resource Control—A Source of Competitive Advantage." [retrieved Apr. 19, 2007]. Retrieved from the Internet: www.operax.com. Operax, Tegeluddsvägen 92, SE-115 28, Stockholm, Sweden. Sep. 2005.

"Ellacoya Introduces VoIP Quality Reporter (VQR)." [online] Ellacoya Networks, Inc., [retrieved Apr. 19, 2007] Retrieved from the Internet: <URL: http://www.ellacoya.com/products/vqr.shtml>.

"Ellacoya Multimedia Service Manager (MSM) PacketCable Multimedia-based Application." [online] Ellacoya Networks, Inc., [retrieved Apr. 19, 2007] Retrieved from the Internet: <URL: http://www.ellacoya.com/products/multimediaMgr.shtml>.

"Ellacoya's Scalable Distributed Architecture." [online] Ellacoya Networks, Inc., [retrieved Apr. 19, 2007] Retrieved from the Internet: <URL: http://www.ellacoya.com/products/architecture.shtml>.

"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.

"How IPv4 Multicasting Works," Microsoft TechNet, Microsoft Corporation, Mar. 28, 2003, pp. 1-32.

"How Unicast Ipv4 Routing Protocols and Services Work," Microsoft TechNet, Microsoft Corporation, Mar. 28, 2003, pp. 1-60.

"IMS and Operax Bandwidth Manager—Guaranteed QoS." [retrieved Apr. 19, 2007]. Retrieved from the Internet: www.operax.com. Operax, Tegeluddsvägen 92, SE-115 28, Stockholm, Sweden. 2006.

"Integrating Applications with the CloudShield ONSP." [retrieved Feb. 28, 2007]. Retrived from the Internet: CloudShield Technologies, Inc., www.cloudshiled.com. Cloudshield, 121 Gibraltar Drive, Sunnyvale, California 94089. Aug. 2004.

"Integrated Content Control for An All IP World." [retrieved Feb. 28, 2007]. Retrieved from the Internet: CloudShield Technologies, Inc., www.cloudshiled.com. CloudShield, 212 Gibraltar Drive, Sunnyvale, California 94089.

"IP Service Control System." [retrieved Apr. 19, 2007] Retrieved from the Internet: Ellacoya Networks, Inc., www.ellacoya.com. Ellacoya Networks, 7 Henry Clay Drive, Merrimack, NH 03054 USA. 2005.

"Managed DDoS Security Services: An Arbor Networks/CloudShield Solution." [retrived Feb. 28, 2007]. Retrived from the Internet: CloudShield Technologies, Inc., www.cloudshield.com. CloudShield, 212 Gibraltar Drive, Sunnyvale, California 94089. Aug. 2004.

"Meeting the Multi-Service IP QoS Challenges." [retrieved Apr. 19, 2007]. Retrieved from the Internet: www.operax.com. Operax, Tegeluddsvägen 92, SE-115 28, Stockholm, Sweden.

"On the Road to IP Multi-Service." [retrieved Apr. 19, 2007]. Retrieved from the Internet: www.operax.com. Operax, Tegeluddsvägen 92, SE-115 28, Stockhom, Sweden.

"Operax Bandwidth Manager 5500: QoS control for the access, aggregation and edge." [retrieved Apr. 19, 2007]. Retrieved from the Internet: www.operax.com. Operax, Tegeluddsvägen 92, SE-115 28, Stockholm, Sweden. 2006.

"Operax Bandwidth Manager 5700: QoS control for IP/MPLS Networks." [retrieved Apr. 19, 2007]. Retrieved from the Internet; www.operax.com. Operax, Tegeluddsvägen 92, SE-115 28, Stockholm, Sweden. 2006.

"Operax guarantees QoS for Video Telephony: QoS guaranteed value added services." [retrieved Apr. 19, 2007]. Retrieved from the Internet: www.operax.com. Operax, Tegeluddsvägen 92, SE-115 28, Stockholm, Sweden. 2005.

"Operax in IP Multimedia Subsystem (IMS): Advanced QoS control for IMS/NGN." [retrieved Apr. 19, 2007]. Retrieved from the Internet: www.operax.com. Operax, Tegeluddsvägen 92, SE-115 28, Stockholm, Sweden. 2006.

"Operax Triple Play: Service Control System." [retrieved Apr. 19, 2007]. Retrieved from the Internet: www.operax.com. Operax, Tegeluddsvägen 92, SE-115 28, Stockholm, Sweden. 2005.

"Prolexic DNS Shield on CS-2000: Prolexic and CloudShield Integrated Solution for DNS Service Protection." [retrieved Feb. 28, 2007]. Retrieved from the Internet: CloudShield Technologies, Inc., www.cloudshield.com. CloudShield, 212 Gibraltar Drive, Sunnyvale, California 94089. 2005.

"A Unified Policy Management Framework: IP Service Creation and Assurance in Converged Networks." [retrieved Apr. 19, 2007]. Retrieved from the Internet: www.operax.com. Operax, Tegeluddsvägen 92, SE-115 28, Stockholm, Sweden. Nov. 2006.

"What is Unicast IPv4 Routing?" Microsoft TechNet, Microsoft Corporation, Mar. 28, 2003, pp. 1-6.

PCT/CA2006/000555, PCT International Search Report and Written Opinion, Jul. 26, 2006.

PCT/CA2006/000554, PCT International Search Report and Written Opinion, Aug. 1, 2006.

PCT/CA2006/001414, PCT International Search Report and Written Opinion, Dec. 19, 2006.

PCT/CA2006/001423, PCT International Search Report and Written Opinion, Dec. 18, 2006.

PCT/CA/2006/001469, PCT International Search Report and Written Opinion, Dec. 28, 2006.

"Subjective Video Quality", Retrieved from the Internet (Mar. 29, 2007); Wikipedia, the free encyclopedia, http://en.wikipedia.org/wiki/subjective_video_quality.

"Mean Opinion Score", Retrieved from the Internet (Mar. 29, 2007); Wikipedia, the free encyclopedia, http://en.wikipedia.org/wiki/Mean_Opinion_Score.

Clark, Alan, "RTCP XR Measures VoIP Performance", Retrieved from the Internet (Mar. 30, 2007); Networkworld, http://www.NetworkWorld.com/news/tech/2003/1117techupdate.html.

"Real Time Control Protocol", Retrieved from the Internet (Mar. 30, 2007); Wikipedia, the free encyclopedia, http://en.wikipedia.org/wiki/RTCP.

"Simple Mail Transfer Protocol", Retrieved from the Internet (Mar. 30, 2007); Wikipedia, the free encyclopedia, http//en.wikipedia.org/wiki/Smtp.

"Simple Network Management Protocol", Retrieved from the Internet (Apr. 9,2007); Wikipedia, the free encyclopedia, http//en.wikipedia.org/wiki/SNMP.

PCT/CA2008/000965, PCT International Search Report and Written Opinion of the International Searching Authority, mailed Sep. 2, 2008, 9 pages.

Gupta P. et al., "Packet Classification using Hierarchical Intelligent Cuttings", Computer Systems Laboratory, Stanford University; 1999. (Retrieved from the internet: http://tinytera.stanford.edu/~nickm/papers/HOTI_99.pdf).

Zapater, et al., "A Proposed Approach for Quality of Experience Assurance of IPTV", Proccedings of the First International Conference on the Digital Society (ICDS'07), pp. 25-30, Jan. 2007, IEEE.

* cited by examiner

APPLICATION ROUTING IN A DISTRIBUTED COMPUTE ENVIRONMENT

TECHNICAL FIELD

This disclosure relates generally to packet routing in a distributed environment, and in particular but not exclusively, relates to routing packets to a plurality of applications in a distributed compute environment of a network service node.

BACKGROUND INFORMATION

The Internet is becoming a fundamental tool used in our personal and professional lives on a daily basis. As such, the bandwidth demands placed on network elements that underpin the Internet are rapidly increasing. In order to feed the seemingly insatiable hunger for bandwidth, parallel processing techniques have been developed to scale compute power in a cost effective manner.

As our reliance on the Internet deepens, industry innovators are continually developing new and diverse applications for providing a variety of services to subscribers. However, supporting a large diversity of services and applications using parallel processing techniques within a distributed compute environment introduces a number of complexities. One such complexity is to ensure that all available compute resources in the distributed environment are efficiently shared and effectively deployed. Ensuring efficient sharing of distributed resources requires scheduling workloads amongst the distributed resources in an intelligent manner so as to avoid situations where some resources are overburdened, while others lay idle. Another such complexity is how to support new and unexpected behavior demanded by the growing diversity of services within the infrastructure of a distributed environment that has already been deployed in the field.

FIG. 1 illustrates a modern metro area network 100 for providing network services to end users or subscribers. Metro area network 100 is composed of two types of networks: a core network 102 and one or more access networks 106. Core network 102 communicates data traffic from one or more service providers 104A-104N in order to provide services to one or more subscribers 108A-108M. Services supported by the core network 102 include, but are not limited to, (1) a branded service, such as a Voice over Internet Protocol (VoIP), from a branded service provider; (2) a licensed service, such as Video on Demand (VoD) or Internet Protocol Television (IPTV), through a licensed service provider and (3) traditional Internet access through an Internet Service Provider (ISP).

Core network 102 may support a variety of protocols (Synchronous Optical Networking (SONET), Internet Protocol (IP), Packet over SONET (POS), Dense Wave Division Multiplexing (DWDM), Border Gateway Protocol (BGP), etc.) using various types of equipment (core routers, SONET add-drop multiplexers, DWDM equipment, etc.). Furthermore, core network 102 communicates data traffic from the service providers 104A-104N to access network(s) 106 across link(s) 112. In general, link(s) 112 may be a single optical, copper or wireless link or may comprise several such optical, copper or wireless link(s).

On the other hand, the access network(s) 106 complements core network 102 by aggregating the data traffic from the subscribers 108A-108M. Access network(s) 106 may support data traffic to and from a variety of types of subscribers 108A-108M, (e.g. residential, corporate, mobile, wireless, etc.). Although access network(s) 106 may not comprise of each of the types of subscriber (residential, corporate, mobile, etc), access(s) network 106 will comprise at least one subscriber. Typically, access network(s) 106 supports thousands of subscribers 108A-108M. Access networks 106 may support a variety of protocols (e.g., IP, Asynchronous Transfer Mode (ATM), Frame Relay, Ethernet, Digital Subscriber Line (DSL), Point-to-Point Protocol (PPP), PPP over Ethernet (PPPoE), etc.) using various types of equipment (Edge routers, Broadband Remote Access Servers (BRAS), Digital Subscriber Line Access Multiplexers (DSLAM), Switches, etc). Access network(s) 106 uses a subscriber policy manager (s) 110 to set policies for individual ones and/or groups of subscribers. Policies stored in a subscriber policy manager(s) 110 allow subscribers access to different ones of the service providers 104A-N. Examples of subscriber policies are bandwidth limitations, traffic flow characteristics, amount of data, allowable services, etc.

Subscriber traffic flows across access network(s) 106 and core network 102 in data packets. A data packet (also known as a "packet") is a block of user data with necessary address and administration information attached, usually in a packet header and/or footer, which allows the data network to deliver the data packet to the correct destination. Examples of data packets include, but are not limited to, IP packets, ATM cells, Ethernet frames, SONET frames and Frame Relay packets. Typically, data packets having similar characteristics (e.g., common source and destination) are referred to as a flow.

FIG. 2 represents the Open Systems Interconnection (OSI) model of a layered protocol stack 200 for transmitting data packets. Each layer installs its own header in the data packet being transmitted to control the packet through the network. The physical layer (layer 1) 202 is used for the physical signaling. The next layer, data link layer (layer 2) 204, enables transferring of data between network entities. The network layer (layer 3) 206 contains information for transferring variable length data packet between one or more networks. For example, IP addresses are contained in the network layer 206, which allows network devices (also commonly referred to a network elements) to route the data packet. Layer 4, the transport layer 208, provides transparent data transfer between end users. The session layer (layer 5) 210, provides the mechanism for managing the dialogue between end-user applications. The presentation layer (layer 6) 212 provides independence from difference in data representation (e.g. encryption, data encoding, etc.). The final layer is the application layer (layer 7) 212, which contains the actual data used by the application sending or receiving the packet. While most protocol stacks do not exactly follow the OSI model, it is commonly used to describe networks.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for routing packets to applications executing in a distributed environment of a network service node are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "flow" or "packet flow" is defined herein as a sequence of related packets having common characteristics. For example, a sequence of packets moving through a network node having a common N-tuple signature may be defined as a single flow. In one embodiment, the N-tuple signature is a 6-tuple signature including the following packet fields: destination address, source address, destination port, source port, protocol, and differentiated service code point. A "classification rule" is defined herein as the combination of classification criteria with an associated action or actions to be performed on the classified packet flow. The classification criteria may be an exact match N-tuple signature or various wildcard signatures (e.g., range match, prefix match, non-contiguous bit masking match, ternary "don't care" match, etc.). The action or actions may be a forwarding action, an interception action, a bifurcation (e.g., replication) action, a termination action, some combination thereof, or various other processing actions.

Figure 1:
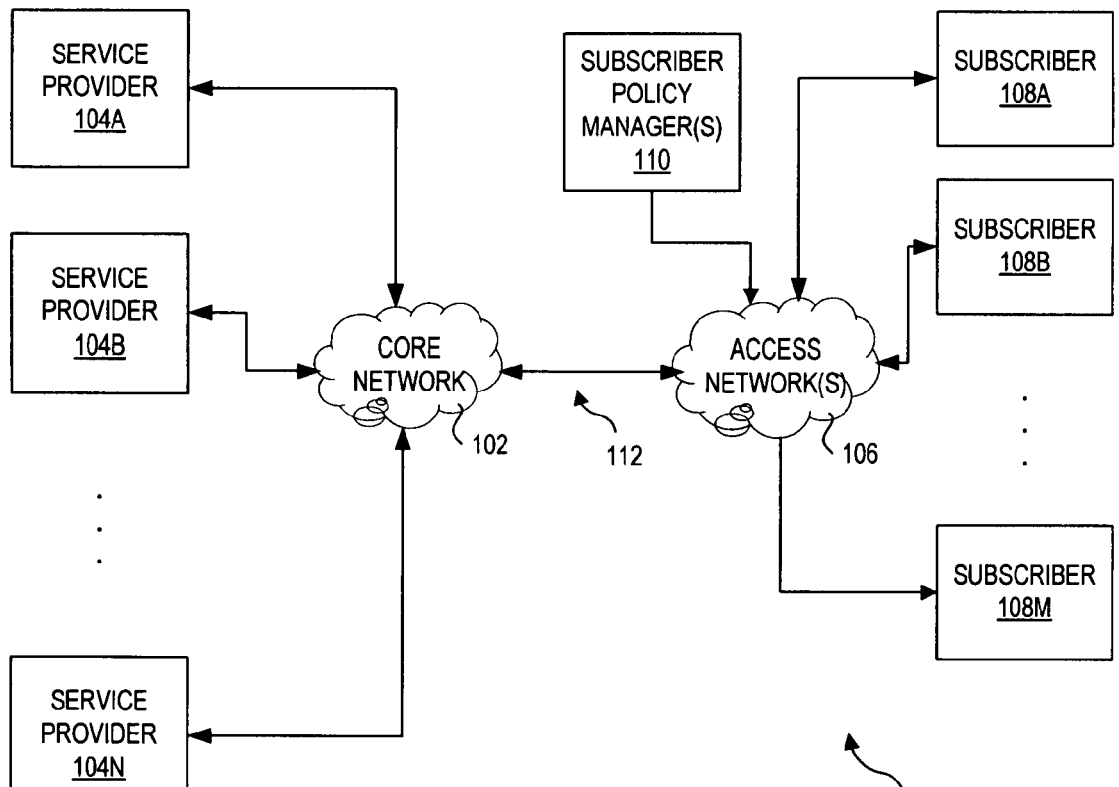
FIG. 1 (Prior Art) illustrates a typical metro area network configuration.
Figure 2:
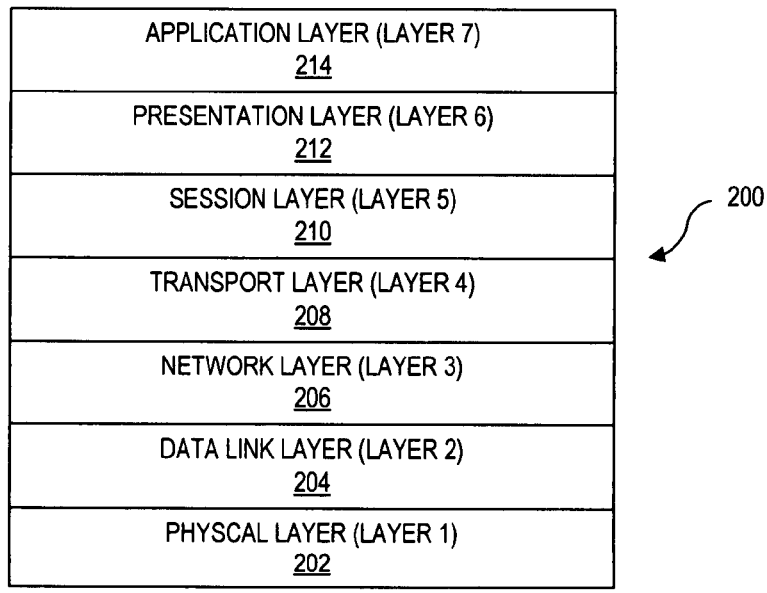
FIG. 2 (Prior Art) is a block diagram illustrating layers of the Open Systems Interconnect protocol stack.
Figure 3:
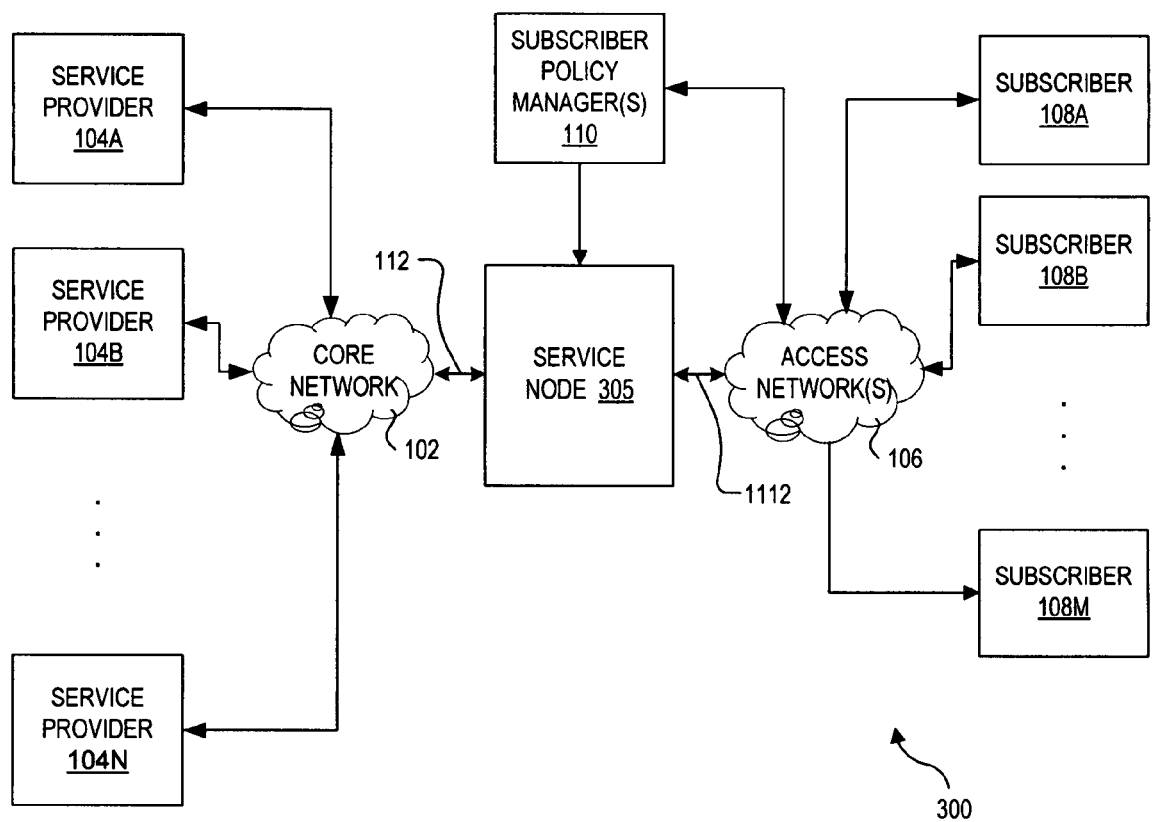
FIG. 3 is a block diagram illustrating a demonstrative metro area network configuration including a network service node to provide application and subscriber aware packet processing, in accordance with an embodiment of the invention

FIG. 3 is a block diagram illustrating a demonstrative metro area network 300 including a network service node 305 to provide application and subscriber aware packet processing, in accordance with an embodiment of the invention. Metro area network 300 is similar to metro area network 100 with the exception of network service node 305 inserted at the junction between access network 106 and core network 102.

In one embodiment, network service node 305 is an application and subscriber aware network element capable of implementing application specific policies on a per subscriber basis at line rates. For example, network service node 305 can perform quality of service ("QoS") tasks (e.g., traffic shaping, flow control, admission control, etc.) on a per subscriber, per application basis, while monitoring quality of experience ("QoE") on a per session basis. To enable QoS and QoE applications for a variety of network services (e.g., VoD, VoIP, IPTV, etc.), network service node 305 is capable of deep packet inspection all the way to the session and application layers of the OSI model. To provide this granularity of service to hundreds or thousands of unique subscribers requires leveraging parallel processing advantages of a distributed compute environment.

Figure 4:
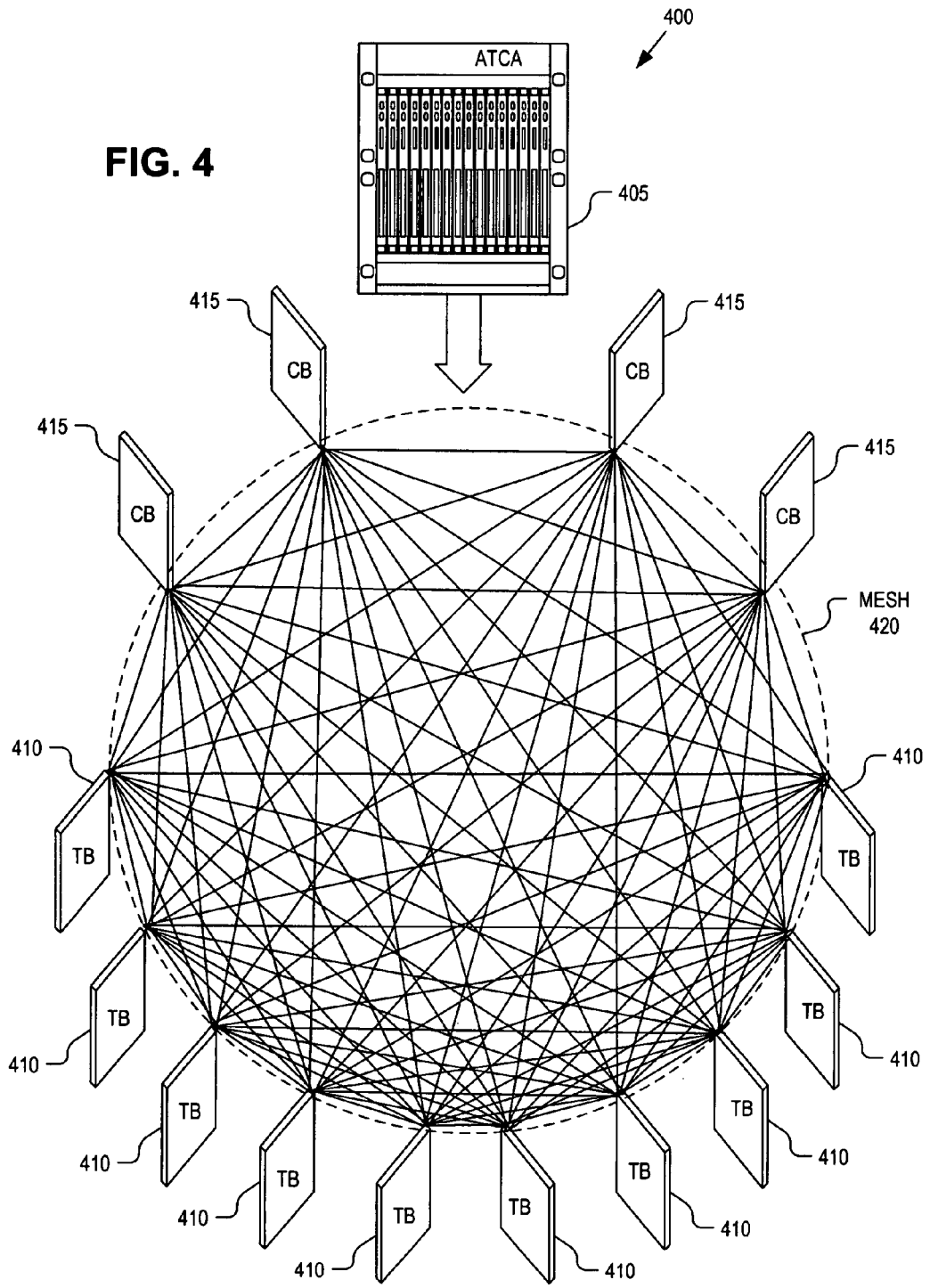
FIG. 4 is a schematic diagram illustrating one configuration of a network service node implemented using an Advanced Telecommunication and Computing Architecture chassis with full-mesh backplane connectivity, in accordance with an embodiment of the invention.

FIG. 4 is a schematic diagram illustrating a network service node 400 implemented using an Advanced Telecommunication and Computing Architecture ("ATCA") chassis with full-mesh backplane connectivity, in accordance with an embodiment of the invention. Network service node 400 is one possible implementation of network service node 305.

In the configuration illustrated in FIG. 4, an ATCA chassis 405 is fully populated with 14 ATCA blades—ten traffic blades ("TBs") 410 and four compute blades ("CBs") 415—each installed in a respective chassis slot. In an actual implementation, chassis 405 may be populated with less blades or may include other types or combinations of TBs 410 and CBs 415. Furthermore, chassis 405 may include slots to accept more or less total blades in other configurations (e.g., horizontal slots). As depicted by interconnection mesh 420, each blade is communicatively coupled with every other blade under the control of fabric switching operations performed by each blade's fabric switch. In one embodiment, mesh interconnect 420 provides a 10 Gbps connection between each pair of blades, with an aggregate bandwidth of 280 Gbps. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

In the illustrated embodiments, network service node 400 is implemented using a distributed architecture, wherein various processor and memory resources are distributed across multiple blades. To scale a system, one simply adds another blade. The system is further enabled to dynamically allocate processor tasks, and to automatically perform failover operations in response to a blade failure or the like. Furthermore, under an ATCA implementation, blades may be hot-swapped without taking the system down, thus supporting dynamic scaling.

Figure 5:
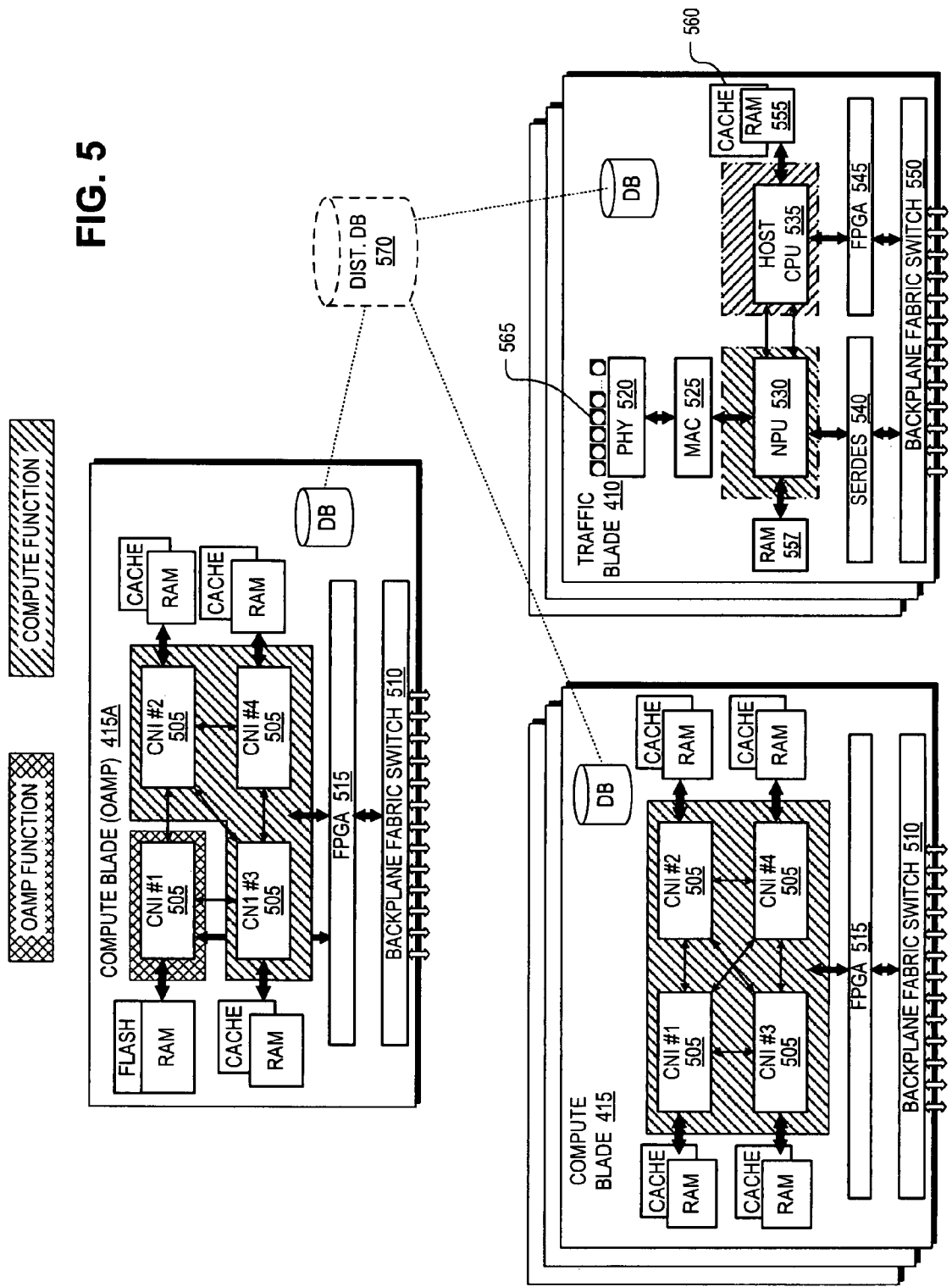
FIG. 5 is a functional block diagram illustrating traffic and compute blade architecture of a network service node for supporting application and subscriber aware packet processing, in accordance with an embodiment of the invention.

FIG. 5 is a functional block diagram illustrating demonstrative hardware architecture of TBs 410 and CBs 415 of network service node 400, in accordance with an embodiment of the invention. The illustrated embodiment of network service node 400 uses a distinct architecture for TBs 410 versus CBs 415, while at least one of CBs 415 (e.g., compute blade 415A) is provisioned to perform operations, administration, maintenance and provisioning ("OAMP") functionality (the OAMP CB).

CBs 415 each employ four compute node instances ("CNIs") 505. CNIs 505 may be implemented using separate processors or processor chips employing multiple processor cores. For example, in the illustrated embodiment of FIG. 5, each of CNI 505 is implemented via an associated symmetric multi-core processor. Each CNI 505 is enabled to communicate with other CNIs via an appropriate interface, such as for example, a "Hyper Transport" (HT) interface. Other native (standard or proprietary) interfaces between CNIs 505 may also be employed.

As further depicted in FIG. 5, each CNI 505 is allocated various memory resources, including respective RAM. Under various implementations, each CNI 505 may also be allocated an external cache, or may provide one or more levels of cache on-chip.

Each CB 415 includes an interface with mesh interconnect 420. In the illustrated embodiment of FIG. 5, this is facilitated by a backplane fabric switch 510, while a field programmable gate array ("FPGA") 515 containing appropriate programmed logic is used as an intermediary component to enable each of CNIs 505 to access backplane fabric switch 510 using native interfaces. In the illustrated embodiment, the interface between each of CNIs 505 and the FPGA 515 comprises a system packet interface ("SPI"), while the interface between FPGA 515 and backplane fabric switch 510 comprises a Broadcom HiGig™ interface. It is noted that these interfaces are mere examples, and that other interfaces may be employed.

In addition to local RAM, the CNI 505 associated with the OAMP function (depicted in FIG. 5 as CNI #1 of CB 415A, hereinafter referred to as the OAMP CNI) is provided with a local non-volatile store (e.g., flash memory). The non-volatile store is used to store persistent data used for the OAMP function, such as provisioning information and logs. In CBs 415 that do not support the OAMP function, each CNI 505 is provided with local RAM and a local cache.

FIG. 5 further illustrates a demonstrative architecture for TBs 410. TBs 410 include a PHY block 520, an Ethernet MAC block 525, a network processor unit (NPU) 530, a host processor 535, a serializer/deserializer ("SERDES") interface 540, an FPGA 545, a backplane fabric switch 550, RAM 555 and 557 and cache 560. TBs 410 further include one or more I/O ports 565, which are operatively coupled to PHY block 520. Depending on the particular use, the number of I/O ports 565 may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

One of the operations performed by TBs 410 is packet identification/classification. A multi-level classification hierarchy scheme is implemented for this purpose. Typically, a first level of classification, such as a 5 or 6 tuple signature classification scheme, is performed by NPU 530. Additional classification operations in the classification hierarchy may be required to fully classify a packet (e.g., identify an application flow type). In general, these higher-level classification operations are performed by CBc 415 via interception or bifurcation of packet flows at TBs 410; however, some higher-level classification may be performed by the TB's host processor 535. Classification rules used to classify packet flows may be distributed about network service node 305 via a distributed database 570. In one embodiment, one or more instances of distributed database 570 reside on each TB 410 and each CB 415.

Typically, NPUs are designed for performing particular tasks in a very efficient manner. These tasks include packet forwarding and packet classification, among other tasks related to packet processing. NPU 530 includes various interfaces for communicating with other board components. These include an Ethernet MAC interface, a memory controller (not shown) to access RAM 557, Ethernet and PCI interfaces to communicate with host processor 535, and an XGMII interface. SERDES interface 540 provides the interface between XGMII interface signals and HiGig signals, thus enabling NPU 530 to communicate with backplane fabric switch 550. NPU 530 may also provide additional interfaces to interface with other components (not shown).

Similarly, host processor 535 includes various interfaces for communicating with other board components. These include the aforementioned Ethernet and PCI interfaces to communicate with NPU 530, a memory controller (on-chip or off-chip—not shown) to access RAM 555, and a pair of SPI interfaces. FPGA 545 is employed as an interface between the SPI interface signals and the HiGig interface signals.

Host processor 535 is employed for various purposes, including lower-level (in the hierarchy) packet classification, gathering and correlation of flow statistics, and application of traffic profiles. Host processor 535 may also be employed for other purposes. In general, host processor 535 will comprise a general-purpose processor or the like, and may include one or more compute cores. In one embodiment, host processor 535 is responsible for initializing and configuring NPU 530 (e.g., via network booting).

Figure 6:
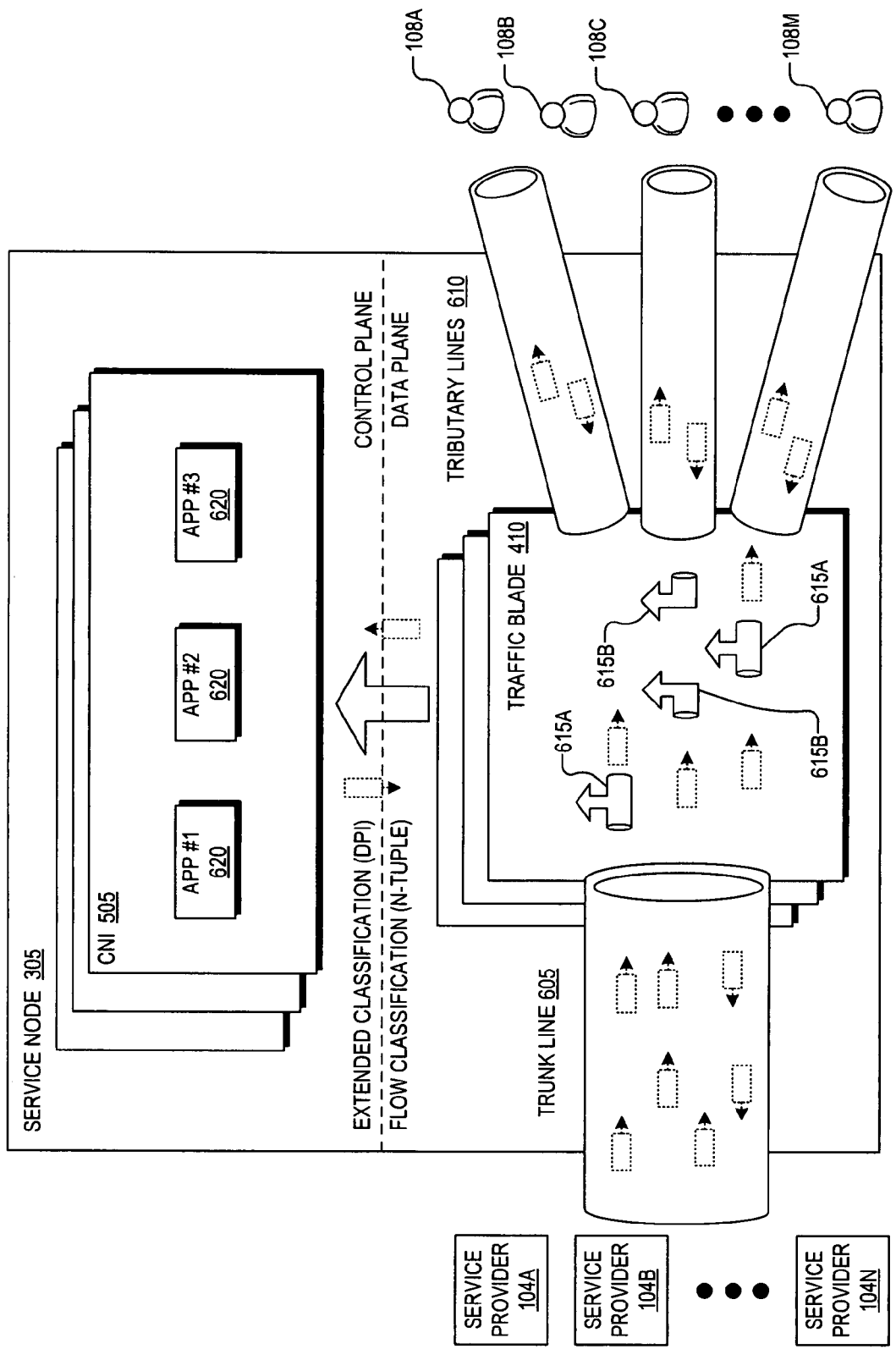
FIG. 6 is a functional block diagram illustrating multi-level packet classification scheme in a distributed compute environment, in accordance with an embodiment of the invention.

FIG. 6 is a functional block diagram illustrating a multi-level packet classification scheme executed within network service node 305, in accordance with an embodiment of the invention. The multi-level classification scheme separates packet flow classification in the data plane, where admission control and packet forwarding is executed, from the packet classification in the control plane, where deep packet inspection (e.g., packet inspection at layers 5 to 7 of the OSI model), application processing (layer 7 processing of application data within a packet flow), control processing, and other supervisory/managerial processing is executed.

During operation, packets arrive and depart service node 305 along trunk line 605 from/to service providers 104 and arrive and depart service node 305 along tributary lines 610 from/to subscribers 108. Upon entering TBs 410, access control is performed by comparing Internet protocol ("IP") header fields, Ethernet header fields, or TCP/UDP header fields against an access control list ("ACL") to determine whether the packets have permission to enter service node 305. Access control may be performed by a hardware abstraction layer ("HAL") of TBs 410. If access is granted, then network service node 305 will proceed to classify each arriving packet.

The first level of classification occurs in the data plane and is referred to as flow classification. Flow classification includes matching upon N fields (or N-tuples) of a packet to determine which classification rule to apply and then executing an action associated with the matched classification rule. TBs 410 perform flow classification in the data plane as a prerequisite to packet forwarding and/or determining whether extended classification is necessary by CBs 415 in the control plane. In one embodiment, flow classification involves 6-tuple classification performed on the TCP/IP packet headers (i.e., source address, destination address, source port, destination port, protocol field, and differentiated service code point).

Based upon the flow classification, TBs 410 may simply forward the traffic, terminate the traffic, bifurcate the traffic, intercept the traffic, notify the control plane of the flow, or otherwise. If a TB 410 determines that a bifurcation classification criteria (bifurcation filter 615A) has been matched, the TB 410 will generate a copy of the packet that is sent to one of CBs 415 for extended classification, and forward the original packet towards its destination. If a TB 410 determines that an interception classification criteria (interception filter 615B) has been matched, the TB 410 will divert the packet to one of CBs 415 for extended classification and application processing prior to forwarding the packet to its destination.

CBs 415 perform extended classification via deep packet inspection ("DPI") to further identify application level classification rules to apply to the received packet flows. Extended classification may include inspecting the bifurcated or intercepted packets at the application level to determine to which application 620 a packet flow should be routed. In one embodiment, applications 620 may perform additional application classification on the packet flows to determine the specific application processing that should be performed on a packet flow. Application classification enables applications 620 to apply application specific rules to the traffic, on a per subscriber basis. For example, application #1 may be a VoIP QoE application for monitoring the quality of experience of a VoIP service, application #2 may be a VoD QoE application for monitoring the quality of experience of a VoD service, and application #3 may be an IP filtering application providing uniform resource locator ("URL") filtering to block undesirable traffic, an email filter, a parental control filter on an IPTV service, or otherwise. In one embodiment, network applications 620 may intercommunicate to exchange information about flows. It should be appreciated that CBs 415 may execute any number of network applications 620 for implementing a variety of networking functions.

Figure 7:
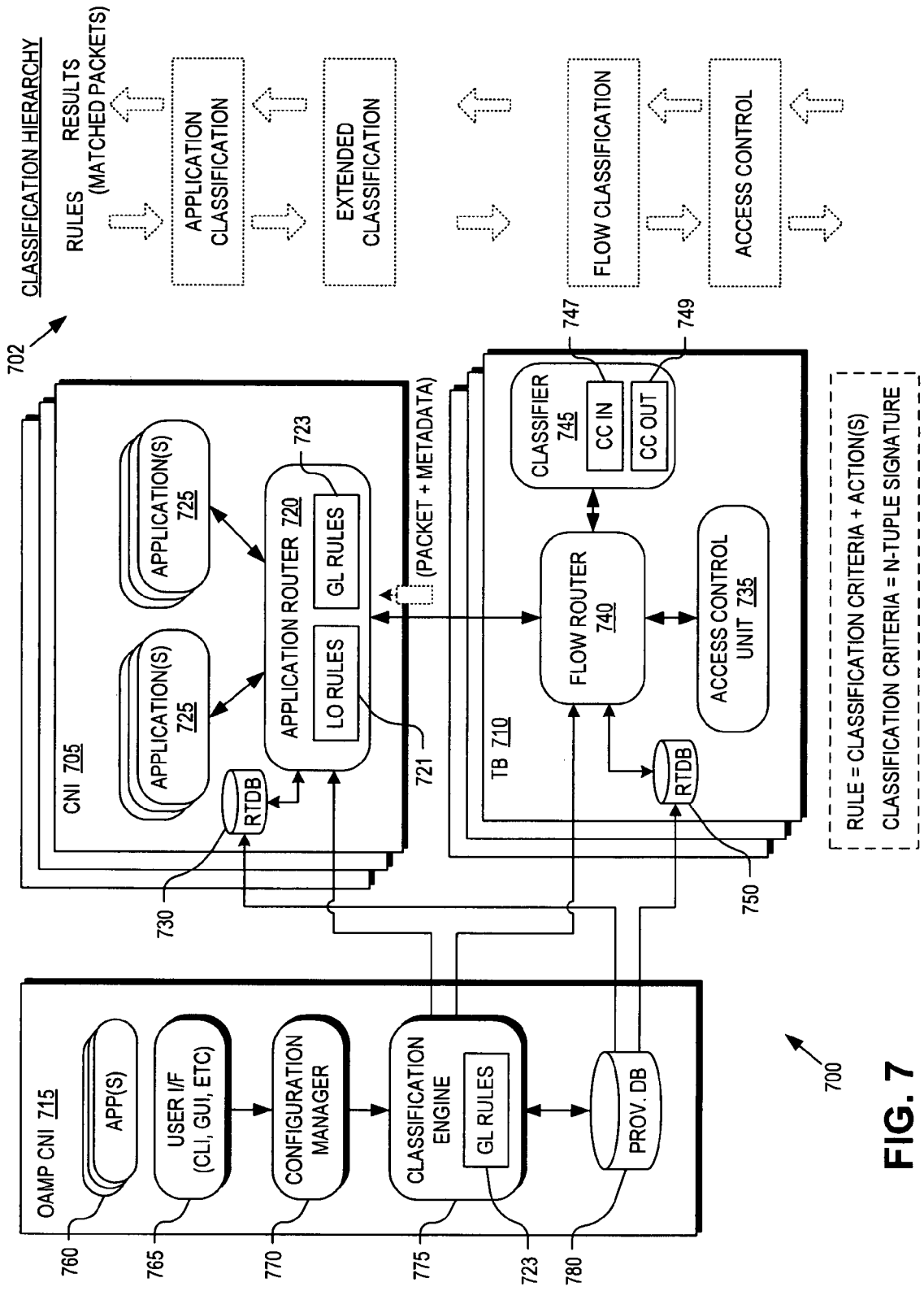
FIG. 7 is a functional block diagram illustrating distributed components for implementing a multi-level classification scheme, in accordance with an embodiment of the invention.

FIG. 7 is a functional block diagram illustrating components of a distributed compute environment 700 for implementing a multi-level classification hierarchy 702, in accordance with an embodiment of the invention. The illustrated of distributed compute environment 700 includes CNIs 705, TBs 710, and an OAMP CNI 715. CNIs 705 may be implemented by CNIs 505, TBs 710 may be implemented by TBs 410, and OAMP CNI 715 may be implemented by CNI(1) 505 of CB 415A.

The illustrated embodiment of CNIs 705 each include an application router 720, network applications 725, and an instance 730 of a runtime database ("RTDB") executing therein. The illustrated embodiment of TBs 710 each include an access control unit 735, a flow router 740, a classifier 745, and an instance 750 of RTDB executing therein. The illustrated embodiment of OAMP CNI 715 includes network applications 760, a user interface 765, a configuration manager 770, a classification engine 775, and a provisioning database 780. FIG. 7 illustrates operational components that reside on each CNI 705, TB 710, and OAMP CNI 715. It should be appreciated that network service node 305 may include a plurality of CNIs 705 with each CNI including its own instances of the operational components illustrated in CNI 705. Similarly, network service node 305 may include a plurality of TBs 710 and therefore many instances of each operational component illustrated executing on TB 710. Finally, network service node 305 may include one or more backups of OAMP CNI 715 and therefore include standby redundancies of the operational components illustrated within OAMP CNI 715.

During operation, access control unit 735 executes access control to permit or deny packet flows into network service node 305. Flow router 740 and classifier 745 perform flow classification on permitted packets to classify the permitted packets into flows of related packets (i.e., packet flows). Although classifier 745 and flow router 740 are illustrated as distinct, in one embodiment, classifier 745 is a sub-element of flow router 740.

As discussed above, a classification rule is the combination of classification criteria (e.g., N-tuple signature) and one or more actions to be executed on a packet flow matching the associated classification criteria. Classifier 745 represents a classification structure that may be implemented in hardware (e.g., ternary content addressable memory ("TCAM")), software (e.g., list, tree, trie, etc.), or some combination thereof. Classifier 745 performs the matching function to determine which classification criteria a particular packet matches, while flow router 740 executes the associated function on the particular packet (e.g., bifurcate, intercept, terminate, notify, forward, etc.).

In one embodiment, classifier 745 operates on a first "hit" policy. Classifier 745 will search for matching classification criteria, until a first match is found and search no further. Accordingly, classification criteria that are installed into classifier 745 with higher priority will mask lower priority classification criteria having overlapping criteria. In one embodiment, classifier 745 maintains two separate groups or lists of classification criteria—inbound classification criteria 747 and outbound classification criteria 749. Inbound classification criteria 747 is used to match against packets inbound to subscribers 108, while outbound classification criteria 749 is used to match against packets outbound from subscribers 108. Maintaining inbound and outbound classification criteria independent of each other simplifies the flow classification process and avoids rule masking in the scenario where two subscribers 108 are communicating with each other and all subscriber traffic is arriving or departing along tributary lines 610. Maintaining separate inbound and outbound classification criteria also enables different CNIs 705 to be assigned for processing inbound traffic for a particular subscriber 108 from the CNI 705 assigned for processing outbound traffic for the particular subscriber 108.

When flow router 740 determines that a particular packet is to be routed to the control plane for extended classification (e.g., intercepted or bifurcated), flow router 740 will provide the packet to an appropriate one of application routers 720 along with classification metadata. The classification metadata may include an indication of the N-tuple match determined by classifier 745 (e.g., a matched rule identifier) so that application router 720 need not re-execute the N-tuple matching function.

In one embodiment, flow routers 740 executing on the individual TBs 710 perform a subscriber based classification scheme. In other words, all subscriber traffic associated with the same subscriber is routed to the same application router 720 executing on the same CNI 705. For example, outbound traffic (e.g., traffic arriving on tributary lines 610) may be classified based on the source IP address of the packet flow, while inbound traffic (e.g., traffic arriving on trunk lines 605) may be classified based on the destination IP address. Accordingly, inbound and outbound traffic associated with a single subscriber 108 may be routed to the same CNI 705 or to two independent CNIs 705—one designated for inbound traffic and one designated for outbound traffic. A subscriber based routing scheme enables applications routers 720 and/or network applications 725 to retain stateful information regarding a particular subscriber during the pendancy of a given session or even across multiple sessions.

Application router 720 performs extended classification over and above the flow classification performed by flow router 740 to determine to which of network applications 725 a packet that has been elevated to the control plane should be routed. Extended classification may include DPI to inspect packet data at layers 5 through 7 of the OSI model. In other words, application router 720 may not merely inspect header data, but also payload data. Extended classification may require reconstruction IP fragments or TCP segments prior to performing the DPI. The payload data may carry various signatures of application protocols or application data upon which extended classification criteria is matched against. For example, application router 720 may DPI search for session initiation protocol ("SIP") packets identifiable with various applications running on subscribers 108. The elevated packets may then be routed to the appropriate network application(s) 725 for processing. Application routers 720 will match elevated packets against a set of local rules 721 and global rules 723 while attempting to classify the packets. Local rules 721 include those that are only locally applicable to subscriber traffic relevant to network applications 725 executing on the single CNI 705. Global rules 723 are more generally applicable to subscriber traffic that may be elevated to multiple different CNIs 705. In particular, global rules 723 may include various wildcard or multi-match classification criteria that could match subscriber traffic assigned to multiple different CNIs 705.

In one embodiment, application router 720 performs application routing to provide packets to the appropriate network applications 725. In some cases, multiple network applications 725 need to inspect the same packet. Accordingly, routing packets within a single CNI 705 need not provide redundant copies of the packet to each network application 725. Rather, application router 720 may simply store a packet in a memory location and provide pointers to the memory location to multiple network applications 725. Finally, network applications 725 may perform application classification on packets promoted to network applications 725. Application classification may be performed to determine the specific action or function to perform on the packet.

In some embodiments, network applications 725 are distributed applications having an instance executing on each CNI 705, as well as, a managerial instance executing on OAMP CNI 715 (e.g., applications 760). OAMP CNI 715 includes a user interface 765 (e.g., command line interface, graphical user interface, etc.) providing a portal for an IT technician to install new software, classification criteria, etc. onto network service node 305. Configuration manager 770 receives the new software updates or configuration settings, performs semantic checks, and stores the updates/configuration settings into provisioning database 780. Classification engine 775 operates as a centralized application router for creating, managing, and installing global rules 723. In particular, classification engine 775 performs a flattening operation on global rules 723 (discussed in detail below). This flattening operation compares new installed rules against existing global rules 723 to ensure the new rules do not mask any global rule 723 already installed. Classification engine 775 may distribute global rules 723 as well as other rules directly to applications routers 720 via inter-process communication ("IPC") or push them down to provisioning database 780, which are then propagated throughout network service node 305 via the distributed instances of the runtime database. Additionally, configuration manager 770 may store rules into provisioning database 780, then send the rules to applications 760, which in turn may install rules into classification engine 775 via a remote procedure call ("RPC").

Figure 8:
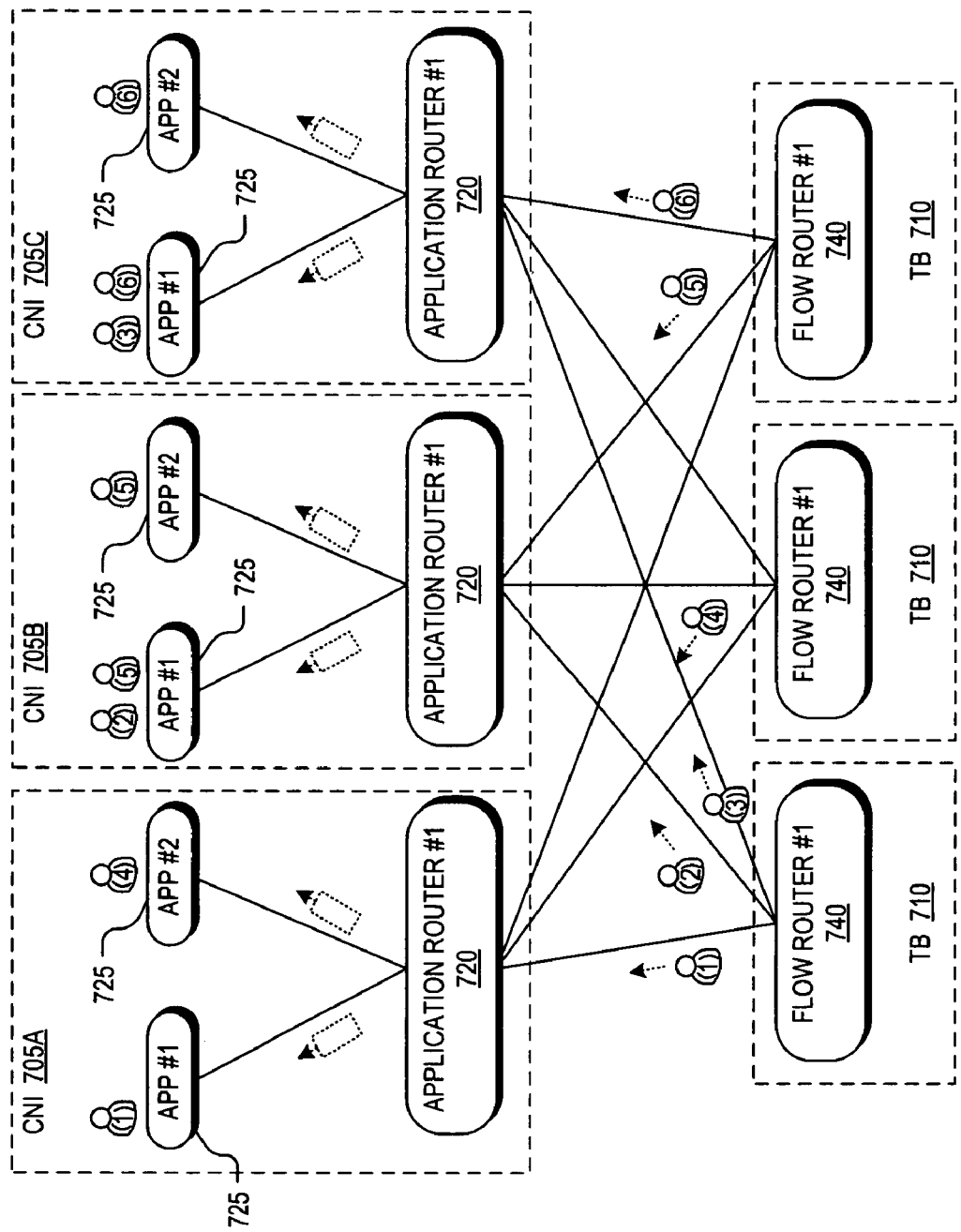
FIG. 8 is a functional block diagram illustrating subscriber based routing and application based routing of subscriber traffic in a network service node, in accordance with an embodiment of the invention.

FIG. 8 is a functional block diagram illustrating subscriber based routing and application based routing of subscriber traffic in a network service node 305, in accordance with an embodiment of the invention. As illustrated, each flow router 740 can route subscriber traffic to any of the application routers 720. Each CNI 705 includes a single application router 720, which is responsible for routing the subscriber traffic to all network applications 725 executing on its CNI 705. Flow routers 740 perform subscriber based routing by routing all subscriber traffic outbound from the same subscriber 108 to the same application router 720. Similarly, all subscriber traffic inbound to the same subscriber 108 is routed to the same application router 720. Inbound and outbound traffic associated with a single subscriber 108 may be routed to the same CNI 705 or to two independent CNIs 705—one designated for inbound traffic and one designated for outbound traffic. Application routers 720 perform application based routing by routing the subscriber traffic to the appropriate network applications 725 executing on its CNI 705.

Since network service node 305 is capable of subscriber specific processing, network applications 725 can provide differentiated services on a per subscriber, per network service basis. For example, network application #1 may provide QoE monitoring functionality for supervising a VoD service, while network application #2 provides a QoE monitoring functionality for supervising a VoIP service. Suppose only subscribers 1, 2, 5, 3, and 6 have subscribed for the VoD service while only subscribers 4, 5, and 6 have subscribed to the VoIP service. As illustrated, subscribers 1 and 4 are assigned to CNI 705A, subscribers 2 and 5 are assigned to CNI 705B, and subscribers 3 and 6 are assigned to CNI 705C. It is the responsibility of flow routers 704 to deliver the subscriber traffic to the appropriate application routers 720, while it is the responsibility of application routers 720 to deliver the subscriber traffic to the appropriate network application 725.

By breaking up the workload on a per subscriber basis and assigning a subsection of subscribers 108 to each of CNIs 705, the overall workload can be broken down into manageable sizes and distributed across CBs and CNIs in an efficient and effective manner. A diversity of network applications 725 can be installed across CNIs 705 to support a variety of services. New and unexpected behavior can be added to network service node 305 by installing updates to existing network applications 725 or by installing entirely new network applications 725. These network applications 725 can dynamically install their own classification rules during runtime into their application routers 720 to identify subscriber traffic deemed relevant for higher level processing.

Because the subscriber traffic is bifurcated by flow routers 740 to the control plane, the higher level processing executed by network applications 725 can proceed without hindering flow routers 740. Once a packet flow has been bifurcated, flow routers can continue to forward the original subscriber traffic towards its destination in the data plane, while the control plane performs higher level processing. In this manner, network service node 305 is capable of providing these differentiated services at line rates.

In some embodiments, network service node 305 may support "promiscuous applications." Promiscuous applications are network applications that are capable of processing subscriber traffic associated with all subscribers 108, irrelevant of which CNI 705 subscribers 108 have been assigned. Promiscuous applications provide a mechanism to support centralized processing (e.g., collection of metrics or statistics) on all subscriber traffic entering/exiting network service node 305.

At least two different variety of promiscuous applications may be supported within network service node 305. The first variety may be installed on their own CNI 705 and capable of installing classification rules directly into flow routers 740. Application routers 720 or classification engine 775 may perform rule flattening on the rules to identifying any overlapping classification criteria. If overlapping classification criteria is found to exist with previously installed classification rules, then flow routers 740 would need to support rule based fanout routing where subscriber traffic associated with a single subscriber may be routed to multiple application routers 720 (e.g., one copy to an application router 720 for routing to a standard network application 725 and one copy to an application router for routing to a promiscuous application). In one embodiment, the rule based fanout routing may be achieved may marking the classification rules with a flag indicating subscriber based routing, promiscuous based routing, or both. The flag may then be referenced to determine to which CNIs 705 a flow should be routed.

A second variety of promiscuous application may also be installed on their own CNI 705, but are associated with promiscuous agents installed on each CNI 705. The promiscuous agents would then be responsible for collecting and forwarding data associated with each subscriber 108 assigned to the individual CNIs 705 to the centralized instance of the promiscuous application. The promiscuous agents would be capable of installing classification rules into their associated application router 720, which can be pushed down to flow routers 740. Flow routers 740 could then continue to execute the less intensive subscriber based routing, while the promiscuous agents would be responsible for collecting and forwarding data in the data plane to the centralized instance of the promiscuous application.

Figure 9:
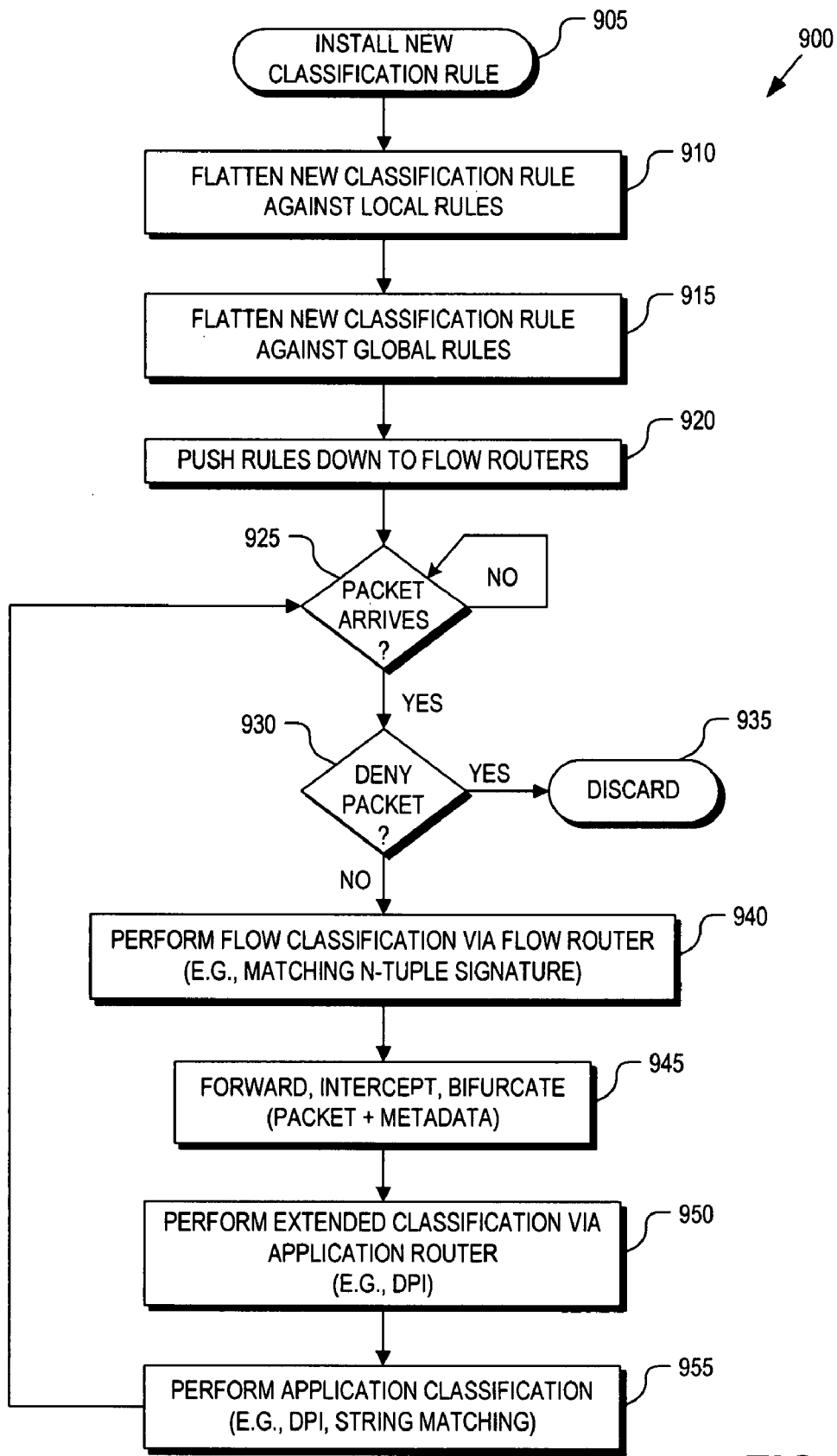
FIG. 9 is a flow chart illustrating a process for routing subscriber traffic to a plurality of applications in a distributed environment, in accordance with an embodiment of the invention.

FIG. 9 is a flow chart illustrating a process 900 for routing subscriber traffic to network applications 725, in accordance with an embodiment of the invention. The order in which some or all of the process blocks appear in process 900 should not be deemed limiting. Rather, one of ordinary skill in the art having the benefit of the present disclosure will understand that some of the process blocks may be executed in a variety of orders not illustrated.

In a process block 905, one of network applications 725 installs a new classification rule into its application router 720. By installing a new classification rule into an application router 720, the particular network application 725 is registering a new request for selected subscriber traffic to be elevated to the control plane. The installed classification rule will include classification criteria identifying specifically which packets or packet flows the network application 725 desires and the action to be taken (e.g., bifurcate or intercept).

Figure 10:
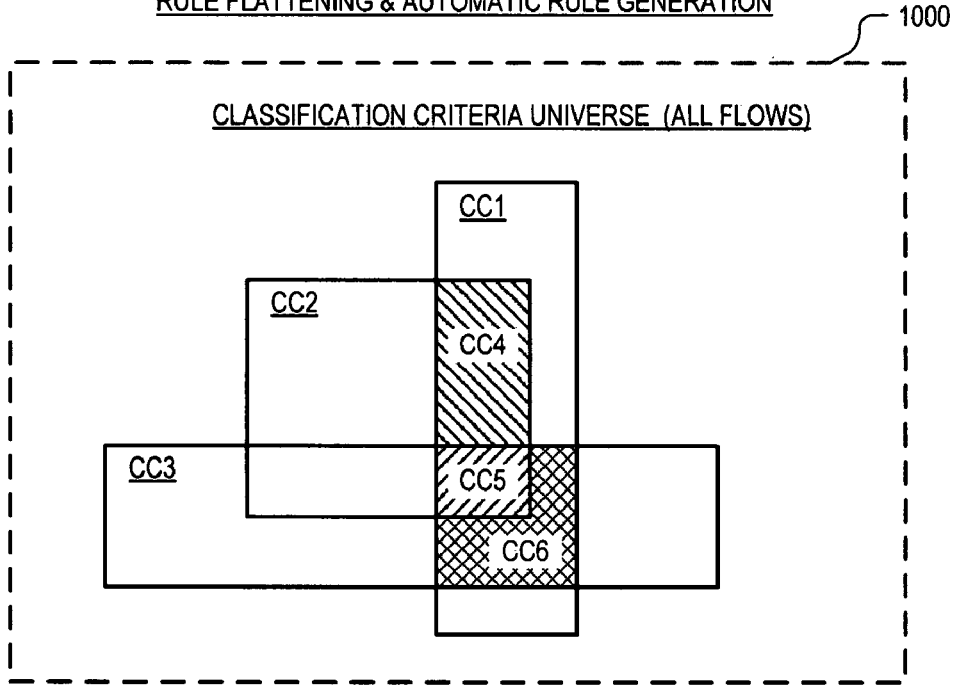
FIG. 10 is block diagram illustrating a process of rule flattening to prevent erroneous rule masking by classification rules installed later-in-time, in accordance with an embodiment of the invention.
Figure 10:
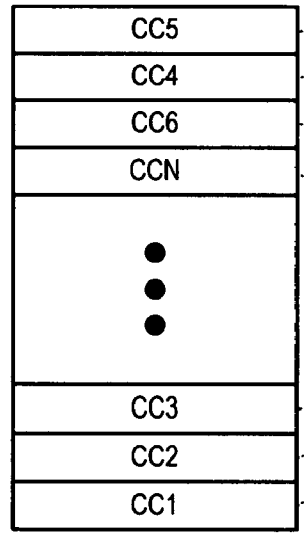

Upon receiving the request for a new classification rule installation, the application router 720 will "flatten" the new classification rule against the existing local rules 721 (process block 910) and against the existing global rules 723 (process block 915). The rule flattening process is illustrated in FIG. 10. FIG. 10 illustrates a classification criteria universe 1000 which delineates the metes and bounds of all possible criteria that could be used to classify packet flows. FIG. 10 also illustrates three installed classification rules R1, R2, and R3 that delineate three corresponding classification criteria CC1, CC2, and CC3 and have three corresponding actions A1, A2, and A3. If classification rules R1, R2, and R3 are application routing rules installed into one of application routers 720, then all packets arriving at the particular application router falling into the metes and bounds of CC1 will be routed according to action(s) A1, falling into the metes and bounds of CC2 will be routed according to action(s) A2, and falling into the metes and bounds of CC3 will be routed according to action(s) A3.

Further assume that R3 was installed after to R2, which was installed after to R1. If the application router performed a first "hit" matching scheme that searches through a classification structure 1005 in descending order, then R3 would partially mask R1 and R2, as would R2 partially mask R1. For example, all packets falling into the metes and bounds of CC5, would only be routed according to action(s) A3, even though the packet should be routed according to actions A1, A2, and A3. Similarly, all packets falling into the metes and bounds of CC6 would also only be routed according to action (s) A3, when they should be routed according to actions A1 and A3. In other words, classification rules installed later in-time by one network application could mask classification rules installed previous-in-time by other network applications, causing the other network applications to miss subscriber traffic.

Accordingly, rule flattening is a process executed by application routers 720 to ensure classification rules installed later-in-time do not mask earlier installed classification rules. It should be appreciated that this discussion is equally applicable to flow routers 740, if flow routers 740 are permitted to perform rule flattening. Rule flattening prevents rule masking by identifying overlapping classification criteria and automatically generating new auto-rules specifically tailored for the overlapping classification criteria. Auto-rules having the greatest or deepest degree of overlapping classification criteria are given higher priority and inserted at the top of classification structure 1005 above other auto-rules will lesser overlap and above application installed rules. For example, since CC5 overlaps R1, R2, and R3, auto-rule AR2 having classification criteria CC5 is placed at the top of classification structure 1005. Furthermore, since AR2 overlaps R1, R2, and R3, AR2 is associated with actions A1, A2, and A3 to ensure all requesting network applications 725 receive a copy of all packets falling into the mete and bounds of CC5. Similarly, auto-rule AR1 is generated for overlapping classification criteria CC4 and assigned actions A1 and A2 from overlapping installed rules R1 and R2, while auto-rule AR3 is generated for overlapping classification criteria CC6 and assigned actions A1 and A3 from overlapping installed rules R1 and R3.

Returning to process 900 illustrated in FIG. 9, the particular application router 720 push down the installed extended classification rule to the data plane by installing a flow classification rule into flow routers 740. As mentioned above, depending upon the variety, if promiscuous applications are executing within network service node 305, flow routers 740 may also perform rule flattening.

In a decision block 925, when a packet arrives at one of TBs 710 access control unit 735 will either permit or deny the packet (decision block 930). If the packet is denied access to network service node 305, it is discarded (process block 935). If the packet is granted access, then process 900 continues to a process block 940. In process block 940 the receiving flow router 740 classifies the packet into a flow with the aid of classifier 745 and takes appropriate action(s) (e.g., bifurcate, intercept, forward, drop, etc.) dependent upon the flow classification (process block 945).

For those packets that are elevated to the control plane as a result of the flow classification, the receiving application router 720 performs extended classification on the elevated packet via DPI (process block 950). Dependent upon the result of the extended classification, the particular application router 720 will route (e.g., provide a pointer or other indication to the packet's memory location) the elevated packet to one or more network applications 725 executing on its CNI 705.

Finally, the receiving network applications 725 may perform additional application classification on the elevated packets to determine the precise action to be taken. Application classification may include DPI, string matching, or otherwise. The DPI may include inspecting application data carried within the payload of the packet to generate subscriber specific and/or application specific data relating subscriber traffic flowing inbound to or outbound from a specific application/service executing on a specific subscriber 108.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-readable storage medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
   receiving subscriber traffic at a network service node coupled between subscribers of network services and providers of the network services;
   selectively providing a first portion of the subscriber traffic from a plurality of first level routers to a plurality of second level routers within the network service node;
   selectively providing the first portion of the subscriber traffic from the second level routers to network applications executing within the network service node; and
   processing the first portion of the subscriber traffic at the network applications.

2. The method of claim 1, wherein selectively providing the first portion of the subscriber traffic from the first level routers to the second level routers comprises a subscriber based routing scheme wherein the first portion of the subscriber traffic is routed to the second level routers based at least in part upon to which of the subscribers each packet of the subscriber traffic is associated.

3. The method of claim 2, wherein selectively providing the first portion of the subscriber traffic from the second level routers to the network applications comprises an application based routing scheme wherein the first portion of the subscriber traffic is routed to the network applications based at least in part upon which of the network services is carried by each packet of the subscriber traffic.

4. The method of claim 1, wherein the first level routers comprise a plurality of data plane routers executing within a data plane of the network service node and wherein the second level routers comprise a plurality of control plane routers executing within a control plane of the network service node.

5. The method of claim 4, wherein the data plane routers comprise flow routers executing on corresponding traffic modules within the network service node and wherein the control plane routers comprise application routers executing on corresponding compute node instances ("CNIs") within the control plane of the network service node.

6. The method of claim 5, wherein one of the network applications comprises a promiscuous application executing on a single one of the CNIs, the method further comprising:
   executing promiscuous application agents on each of the other CNIs; and
   forwarding subscriber specific data associated with the subscribers assigned to each of the other CNIs from each of the promiscuous application agents to the promiscuous application for centralized processing at the promiscuous application.

7. The method of claim 5, wherein multiple ones of the CNIs reside on a single compute blade of a plurality of compute blades within the network service node, wherein the traffic modules comprise traffic blades of the network service node, and wherein the traffic blades and the compute blades are communicatively coupled via a mesh interconnect.

8. The method of claim 1, further comprising:
   performing flow classification at the first level routers to classify the subscriber traffic into flows of related packets;
   selectively forwarding the subscriber traffic to its destinations based at least in part upon the flow classification; and
   providing the first portion of the subscriber traffic to the second level routers based at least in part upon the flow classification.

9. The method of claim 8, further comprising performing extended classification, in addition to the flow classification, on the first portion of the subscriber traffic at the second level routers to determine to which of the applications each packet of the first portion of the subscriber traffic is to be routed.

10. The method of claim 8, wherein providing the first portion of the subscriber traffic to the second level routers comprises providing the first portion of the subscriber traffic along with classification metadata to the second level routers, the classification metadata generated by the flow routers during the flow classification.

11. The method of claim 8, wherein performing flow classification at the first level routers to classify the subscriber traffic into flows of related packets comprises:
   classifying the subscriber traffic that is inbound to the subscribers with reference to inbound classification criteria; and classifying the subscriber traffic that is outbound from the subscribers with reference to outbound classification criteria maintained separate from the inbound classification criteria.

12. The method of claim 9 further comprising:
creating global classification rules to be used by the second level routers when performing the extended classification, the global classification rules maintained by a centralized classification engine; and
distributing the global classification rules to the second level routers from the centralized classification engine.

13. The method of claim 12, further comprising:
comparing the global classification rules received by each of the second level routers against local classification rules maintained by each of the second level routers;
generating automatic rules if one or more of the global classification rules include overlapping classification criteria with one or more of the local classification rules, the automatic rules having associated classification criteria limited to the overlapping classification criteria; and
adding the automatic rules to respective classification structures for each of the second level routers with higher priority than the local classification rules and the global classification rules having the overlapping classification criteria.

14. The method of claim 9, further comprising:
installing extended classification rules into the second level routers by the network applications, the extended classification rules to be used during the extended classification; and
installing flow classification rules into the first level routers by the second level routers, the flow classification rules to be used during the flow classification.

15. The method of claim 1, wherein selectively routing the first portion of the subscriber traffic from the first level routers to the second level routers comprises:
selectively bifurcating some packets of the subscriber traffic to provide a bifurcated copy of the some of the packets to the second level routers; and
selectively intercepting other packets of the subscriber traffic to provide intercepted packets to the second level routers prior to forwarding the intercepted packets to their destinations.

16. Computer-readable media that provide instructions that, if executed by a computer, will cause the computer to perform operations comprising:
receiving subscriber traffic at a network service node coupled between subscribers of network services and providers of the network services;
selectively routing a first portion of the subscriber traffic from a plurality of first level routers to a plurality of second level routers within the network service node;
selectively routing the first portion of the subscriber traffic from the second level routers to network applications executing within the network service node; and
processing the first portion of the subscriber traffic at the network applications.

17. The computer-readable media of claim 16, wherein selectively routing the first portion of the subscriber traffic from the first level routers to the second level routers comprises a subscriber based routing scheme wherein the first portion of the subscriber traffic is routed to the second level routers based at least in part upon to which of the subscribers each packet of the subscriber traffic is associated.

18. The computer-readable media of claim 17, wherein selectively routing the first portion of the subscriber traffic from the second level routers to the network applications comprises an application based routing scheme wherein the first portion of the subscriber traffic is routed to the network applications based at least in part upon which of the network services is carried by each packet of the subscriber traffic.

19. The computer-readable media of claim 16, wherein the first level routers comprise a plurality of data plane routers executing within a data plane of the network service node and wherein the second level routers comprise a plurality of control plane routers executing within a control plane of the network service node.

20. The computer-readable media of claim 19, wherein the data plane routers comprise flow routers executing on corresponding traffic modules within the network service node and wherein the control plane routers comprise application routers executing on corresponding compute node instances ("CNIs") within the control plane of the network service node.

21. The computer-readable media of claim 16, further providing instructions that, if executed by the computer, will cause the computer to perform further operations, comprising:
performing flow classification at the first level routers to classify the subscriber traffic into flows of related packets;
selectively forwarding the subscriber traffic to its destinations based at least in part upon the flow classification; and
providing the first portion of the subscriber traffic to the second level routers based at least in part upon the flow classification.

22. The computer-readable media of claim 21, further providing instructions that, if executed by the computer, will cause the computer to perform further operations, comprising:
performing extended classification, in addition to the flow classification, on the first portion of the subscriber traffic at the second level routers to determine to which of the applications each packet of the first portion of the subscriber traffic is to be routed.

23. The computer-readable media of claim 21, wherein performing flow classification at the first level routers to classify the subscriber traffic into flows of related packets comprises:
classifying the subscriber traffic that is inbound to the subscribers with reference to inbound classification criteria; and
classifying the subscriber traffic that is outbound from the subscribers with reference to outbound classification criteria maintained separate from the inbound classification criteria.

24. The computer-readable media of claim 22, further providing instructions that, if executed by the computer, will cause the computer to perform further operations, comprising:
creating global classification rules to be used by the second level routers when performing the extended classification, the global classification rules maintained by a centralized classification engine; and
distributing the global classification rules to the second level routers from the centralized classification engine.

25. The computer-readable media of claim 24, further providing instructions that, if executed by the computer, will cause the computer to perform further operations, comprising:

comparing the global classification rules received by each of the second level routers against local classification rules maintained by each of the second level routers;

generating automatic rules if one or more of the global classification rules include overlapping classification criteria with one or more of the local classification rules, the automatic rules having associated classification criteria limited to the overlapping classification criteria; and adding the automatic rules to respective classification structures for each of the second level routers with higher priority than the local classification rules and the global classification rules having the overlapping classification criteria.

26. The computer-readable media of claim 22, further providing instructions that, if executed by the computer, will cause the computer to perform further operations, comprising:

installing extended classification rules into the second level routers by the network applications, the extended classification rules to be used during the extended classification; and installing flow classification rules into the first level routers by the second level routers, the flow classification rules to be used during the flow classification.

27. The computer-readable media of claim 16, wherein selectively routing the first portion of the subscriber traffic from the first level routers to the second level routers comprises:

selectively bifurcating some packets of the subscriber traffic to provide a bifurcated copy of the some of the packets to the second level routers; and selectively intercepting other packets of the subscriber traffic to provide intercepted packets to the second level routers prior to forwarding the intercepted packets to their destinations.

28. A system for coupling between a plurality of subscribers of network services and providers of the network services, the system comprising a plurality of processors and computer readable media, the computer readable media containing a distributed data structure for execution by the plurality of processors, the distributed data structure comprising:

a plurality of network applications to process subscriber traffic;

a plurality of application routers to perform an extended classification on the subscriber traffic and to selectively provide the subscriber traffic to the network applications based upon the extended classification of the subscriber traffic; and a plurality of flow routers to perform a flow classification on the subscriber traffic to selectively route the subscriber traffic, based upon the flow classification, to the application routers.

29. The system of claim 28, wherein the system further comprises:

a chassis;

a plurality of traffic modules mounted within the chassis, wherein each of the traffic modules includes at least one of the processors to execute at least one of the flow routers;

a plurality of compute modules mounted within the chassis, wherein each of the compute modules includes at least one of the processors to execute at least one of the application routers; and an interconnect to communicatively interconnect the traffic modules and the compute modules to each other.

30. The system of claim 28, wherein the flow routers include a classifier to classifying the subscriber traffic into packet flows based at least in part upon classification criteria applied to packet headers of the packet flows and wherein the flow routers perform a subscriber based routing scheme to selectively route the packet flows associated with each of the subscribers to a corresponding one of the application routers to which each of the subscribers is assigned.

31. The system of claim 30, wherein the application routers perform the extended classification by deep packet inspection of payload data within the packets of the packet flows to determine to which of the network applications each of the packet flows is to be provided.

32. The system of claim 30, wherein the classifier includes inbound classification criteria for classifying the subscriber traffic inbound to the subscribers and outbound classification criteria for classifying the subscriber traffic outbound from the subscribers.

33. The system of claim 28, wherein the network applications include at least one application for monitoring quality of experience of one of the network services provided to the subscribers.

34. The system of claim 28, wherein the network applications install extended classification rules into the application routers to request selected portions of the subscriber traffic from the application routers and the application routers install flow classification rules into the flow routers to request the selected portions of the subscriber traffic from the flow routers.

* * * * *